United States Patent Office 3,562,278
Patented Feb. 9, 1971

3,562,278
1-[2-(2-SUBSTITUTED-3-INDOLYL)ETHYL]-4-SUB-STITUTED-PIPERAZINES
Sydney Archer, Bethlehem, N.Y., assignor to Sterling Drug Inc., New York, N.Y., a corporation of Delaware
No Drawing. Continuation-in-part of application Ser. No. 733,250, May 31, 1968, which is a continuation-in-part of application Ser. No. 634,899, May 1, 1967. This application Sept. 16, 1969, Ser. No. 858,499
Claims priority, application Canada, Apr. 16, 1968, 17,589
Int. Cl. C07d 51/70
U.S. Cl. 260—268                                    17 Claims

ABSTRACT OF THE DISCLOSURE

Novel 1-[2-(2-substituted - 3 - indolyl)ethyl]-4-substituted-piperazines having psychomotor depressant activity.

This application is a continuation-in-part of my prior co-pending application S.N. 733,250, filed May 31, 1968, which is turn is a continuation-in-part of my prior application S.N. 634,899, filed May 1, 1967, both now abandoned.

The present invention relates to 1-[2-(2-substituted-3-indolyl)ethyl]-4-substituted-piperazines having the formula

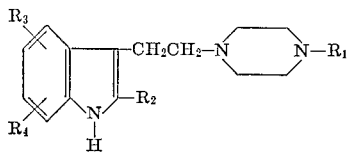

I where $R_1$ is lower-alkyl, hydroxy-lower-alkyl, phenyl, phenyl-unbranched-lower-alkyl, cinnamyl, pyridyl, or 2-pyrimidyl; $R_2$ is carbo-lower-alkoxy, carboxy, sulfo ($SO_3H$), hydroxymethyl, lower-alkanoyloxymethyl, carbamyl, N-lower-alkylcarbamyl, N,N-di-lower-alkylcarbamyl, formyl, or isonitrosomethylene ($CH=NOH$), and alkali metal salts of compounds where $R_2$ is carboxy or sulfo; $R_3$ is hydrogen, halogen, straight or unhindered lower-alkyl, lower-alkoxy, lower-alkylmercapto, trifluoromethyl, or hydroxy; and $R_4$ is hydrogen, halogen, straight or unhindered lower-alkyl or lower-alkoxy, or $R_3$ and $R_4$ together represent methylenedioxy or ethylenedioxy attached to adjacent carbon atoms, and wherein the benzene ring of $R_1$ as phenyl, phenyl-lower-alkyl, or phenyl-lower-alkenyl is unsubstituted or substituted by methylenedioxy or ethylenedioxy or by one or two of the same or different members of the group consisting of halogen, lower-alkyl, lower-alkoxy, lower-alkylmercapto, lower-alkylsulfinyl, lower-alkylsulfonyl, trifluoromethyl, or hydroxy.

As used herein, the terms lower-alkyl, lower-alkoxy, and lower-alkanoyl mean such groups which can be either straight or branched, and which contain from one to seven carbon atoms, and thus the lower-alkyl moiety of such lower-alkyl or lower-alkoxy groups represents, for example, methyl, ethyl, n-propyl, isopropyl, isobutyl, n-hexyl, and the like, and lower-alkanoyl represents, for example, formyl, acetyl, propionyl, α-methylhexanoyl, and the like.

As used herein, the term lower-alkenyl means lower-alkenyl which can be either straight or branched, and which can contain from three to seven carbon atoms, and thus represents 1,3-(1-propenyl), 1,3-(1-butenyl), 1,4-(2-butenyl), and the like.

In the above general Formula I, when $R_1$ as phenyl, phenyl-lower-alkyl, or phenyl-lower-alkenyl is substituted in the benzene ring by one or two of the substituents enumerated above, the substituents can be the same or different and can occupy any available carbon atom of the phenyl ring.

The compounds of Formula I where $R_2$ is carbo-lower-alkoxy are prepared by reacting a 2-carbo-lower-alkoxy-3-(2-haloethyl)indole of Formula II with an appropriate 1-substituted-piperazine of Formula III according to the reaction:

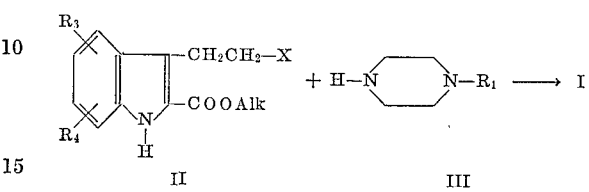

where $R_1$, $R_3$, and $R_4$ have the meanings given above, Alk represents lower-alkyl, and X represents halogen. The reaction can be carried out either in the absence of a solvent or in an organic solvent inert under the conditions of the reaction, for example methanol, ethanol, isopropanol, and the like, and in the presence of an acid-acceptor, the purpose of which is to take up the hydrogen halide split out during the course of the reaction. Suitable acid-acceptors are alkali metal hydroxides, carbonates, or bicarbonates. An excess of the 1-substituted-piperazine can also be used as the acid-acceptor.

The compounds of Formula II, required as intermediates in the above reaction, are prepared by reaction of an appropriate phenylhydrazine with α-keto-δ-valerolactone, under Fischer indole synthesis conditions, and conversion of the resulting 2-carboxy-3-(2-hydroxyethyl)indole of Formula IV to the compounds of Formula II as described hereinbelow. The reactions are represented by the equations:

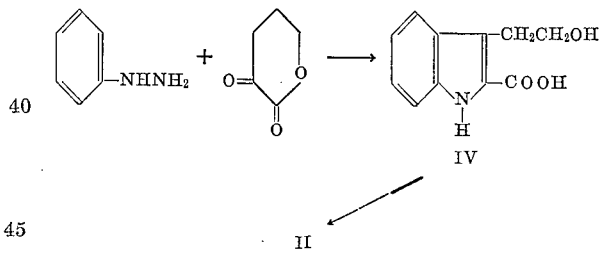

The α-keto-δ-valerolactone is in turn prepared by decarboxylation of an α-carbo-lower-alkoxalyl-γ-butyrolactone by heating the latter in the presence of sulfuric acid. The product isolated from the Fischer indole synthesis described above generally consists of a mixture of the desired 2-carboxy-3-(2-hydroxyethyl)indole and the lactone resulting from esterification between the 2-carboxy and the 3-(2-hydroxyethyl)groups. It is therefore advantageous to reflux the crude product obtained in a lower-alkanol in the presence of excess anhydrous hydrogen halide, which results in the transformation of both Fischer indole products to the desired 2-carbo-lower-alkoxy-3-(2-haloethyl)indole of Formula II.

The compounds of Formula I where $R_2$ is carboxy are prepared by alkaline hydrolysis of the corresponding compounds where $R_2$ is carbo-lower-alkoxy. The reaction is preferably carried out either in an aqueous or an aqueous-alcoholic medium at the reflux temperature thereof and in the presence of an alkali metal hydroxide. If desired, the compounds can be isolated from the alkaline reaction medium to produce the alkali metal salts of the compounds where $R_2$ is carboxy.

The compounds of Formula I where $R_2$ is carbamyl, N-lower-alkylcarbamyl, or N,N-di-lower - alkylcarbamyl, are prepared by reacting the corresponding compounds where $R_2$ is carboxy with a thionyl halide, either in the absence of a solvent or in an inert organic solvent such as benzene, toluene, or xylene, and reacting the resulting 2-haloformyl compound with, respectively, anhydrous ammonia, a lower-alkylamine [e.g. methylamine ($CH_3NH_2$), ethylamine ($C_2H_5NH_2$) or 2-pentylamine

or a di-lower-alkylamine {e.g. dimethylamine

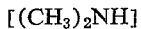

or methylpentylamine ($CH_3NHC_5H_{11}$)}.

The compounds of Formula I where $R_2$ is hydroxymethyl are prepared by reducing the corresponding compounds where $R_2$ is carboxy or carbo-lower-alkoxy with an alkali metal aluminum hydride. The reaction is preferably carried out in an organic solvent inert under the conditions of the reaction, for example diethyl ether, tetrahydrofuran, dibutyl ether, and the like, at temperatures in the range from 0–100° C.

The compounds of Formula I where $R_2$ is hydroxymethyl can also be prepared by alkali metal aluminum hydride reduction, as described above, of a 1-[(2-$R_2$-3-indolyl)acetyl] - 4 - substituted-piperazine having the formula:

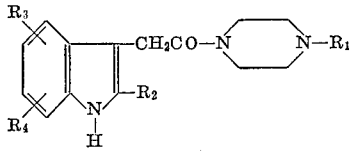

where $R_3$, $R_4$, and Y have the meanings given above, and $R_2$ is carbo-lower-alkoxy, carboxy, or hydroxymethyl.

The compounds of Formula I where $R_2$ is lower-alkanoyl-oxymethyl are prepared by reacting the corresponding compounds where $R_2$ is hydroxymethyl with a lower-alkanoyl halide in an organic solvent inert under the conditions of the reaction, for example benzene, toluene, xylene, and the like, and in the presence of an acid-acceptor, for example pyridine, dimethylaniline, triethylamine, and the like, which is used to take up the hydrogen halide split out during the course of the reaction.

The compounds of Formula I where $R_2$ is sulfo are prepared by reaction of the corresponding compounds where $R_2$ is hydrogen with sodium bisulfite in an aqueous alcoholic medium at a pH of around 7.0. The reaction is preferably carried out at room temperature while bubbling a current of air through the mixture.

The compounds of Formula I where $R_2$ is formyl are prepared by reducing the corresponding compounds where $R_2$ is haloformyl with tri-t-butoxy lithium aluminum hydride in an organic solvent inert under the conditions of the reaction, for example diethyl ether, dibutyl ether, or tetrahydrofuran, at temperatures in the range from 0–50° C.

The compounds of Formula I where $R_2$ is isonitrosomethylene are prepared by reacting the corresponding compounds where $R_2$ is formyl with hydroxylamine, preferably under slightly acidic conditions and in a lower-alkanol solvent at the reflux temperature thereof.

The acid-addition salts of the bases herein described are the form in which the bases are most conveniently prepared for use. The acid moieties or anions in these salt forms are in themselves neither novel nor critical and therefore can be any acid anion or acid-like substance capable of salt formation with the free base form of the compounds. The preferred type of salts are water-soluble pharmacologically acceptable salts, that is, salts whose anions are relatively innocuous to the animal organisms in pharmacological doses of the salts, so that the beneficial physiological properties inherent in the free base are not vitiated by side effects ascribable to the anions; in other words, the latter do not substantially affect the pharmacological properties inherent in the cations. Appropriate pharmacologically acceptable salts within the scope of the invention are those derived from mineral acids such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, quinic acid, and the like, giving the hydrobromide, hydriodide, nitrate, phosphate, sulfamate, sulfate, acetate, citrate, tartrate, lactate, methanesulfonate, ethanesulfonate and quinate, respectively.

Although pharmacologically acceptable salts are preferred, those having toxic anions are also useful. All acid-addition salts are useful intermediates as sources of the free base form even if the particular salt per se is not desired as the final product, as for example when the salt is formed only for purposes of purification or identification, or when it is used as an intermediate in preparing a pharmacologically acceptable salt by ion-exchange procedures.

Pharmacological evaluation of the compounds of Formula I according to standard pharmacological test procedures has demonstrated that they possess psychomotor depressant activity thus indicating their usefulness as tranquilizers.

Psychomotor depressant activity was determined in standard activity cages using the method of Dews, Brit. J. Pharmacol. 8, 46 (1953) in which mice, medicated with the test compound, are placed in wire mesh cages equipped with a photoelectric cell so adjusted that a mouse breaking the beam activates a magnetic digital counter. Thus the number of times the light beam is broken over a period of time is an indication of the motor activity of the animals, and a reduction in the number of counts in the medicated mice over control groups run simultaneously, is taken as evidence of psychomotor depressant activity. The dose at which such reduction in motor activity was observed was recorded as the active-dose. Alternatively, the $ED_{50}$, the Effective Dose in 50% of the animals, was determined from a dose-response curve.

Instead of determining the motor activity of the test animals using a digital counter activated by a photoelectric cell, there can also be used a counting apparatus such as described by Bonta et al., Arch. int. pharmacodyn. 129, 381–394 (1960) in which vertically movable leaf springs affixed to the activity cages activate a direct current ampere hour meter which serves as a counter of the recorded activity. Moreover, as these authors show, compounds which depress motor activity of mice in such activity cages are indicated to possess tranquilizer activity.

The compounds of the invention, when administered orally to mice in the above-described psychomotor activity test, were found to be active in the dose range of from 8 to 300 mg./kg. of body weight.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for use by injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol or oil solutions or oil-water emulsions in the same manner as conventional medicinal substances are prepared.

The chemical structures of the compounds of the invention are established by their mode of synthesis and are corroboated by infrared and ultraviolet spectra, and by the correspondence between calculated values for the elements and values found by chemical analysis.

The following examples will further illustrate specific embodiments of the invention.

EXAMPLE 1

1-[2-(2-carbethoxy-5,6-dimethoxy-3-indolyl)ethyl]-4-phenylpiperazine

To a suspension of 23 g. (1.0 mole) of sodium pellets in 800 ml. of absolute ether was added 80 ml. of a mixture of 86 g. (1.0 mole) of γ-butyrolactone and 146 g. (1.0 mole) of ethyl oxalate. The reaction mixture began to boil gently and was allowed to reflux spontaneously for two hours, after which time the remainder of the γ-butyrolactone and ethyl oxalate mixture was added cautiously. When addition was complete, the mixture was refluxed for one hour, allowed to stand overnight, and the ether removed in vacuo. The residue was mixed with ice, acidified with cold, dilute sulfuric acid, extracted with ether, and the ether extracts dried over sodium sulfate and taken to dryness. Distillation of the residue in vacuo at 0.05 mm. afforded 98 g. of α-ethoxalyl-γ-butyrolactone, collected between 110–126° C.

Forty grams (0.215 mole) of the latter were heated under reflux in 100 ml. of 2 N sulfuric acid until the evolution of carbon dioxide ceased, giving a solution of α-keto-δ-valerolactone.

3,4-dimethoxyphenylhydrazine hydrochloride (44 g., 0.22 mole) was dissolved in 300 ml. of water, treated with a solution of 12.3 g. (0.22 mole) of potassium hydroxide in 50 ml. of water, and cooled. To this mixture was added the abovedescribed solution of α-keto - δ-valerolactone, and the pH of the mixture was adjusted to about 2 with 10% sodium hydroxide. The mixture was warmed on a hot plate for five minutes, allowed to cool, extracted with chloroform, and the extracts dried over magnesium sulfate and concentrated to dryness giving 66 g. of crude hydrazone.

The latter was dissolved in 100 ml. of absolute ethanol, the mixture acidified with 400 ml. of saturated ethanolic hydrogen chloride, and a stream of hydrogen chloride gas was passed through the mixture causing the temperature to rise to 80° C. The solid which separated from the reaction mixture was collected after standing overnight, and washed with cold absolute ethanol to give 38 g. of crude 2-carboxy-5,6 - dimethoxy - 3 - (2-hydroxyethyl)-indole.

The latter was suspended in 300 ml. of absolute ethanol and the solution saturated with anhydrous hydrogen chloride for one hour. The mixture was allowed to stand for two hours, and the solid which separated was collected and dried to give 24 g. of 2-carbethoxy - 5,6-dimethoxy-3-(2-chloroethyl)indole, M.P. 179–181° C.

The latter was added to 15 ml. of 1-phenylpiperazine and the mixture heated at 140–160° C. for one hour and twenty minutes. The cooled mixture was triturated with 100 ml. of ether, filtered, and the ether filtrate concentrated to dryness. The residue was mixed with water and acetic acid, the pH adjusted to about 5.0, and the insoluble material was collected by filtration giving 5 g. of crude product which was recrystallized from methanol to give 2.2 g. of 1-[2-(2 - carbethoxy-5,6 - dimethoxy-3-indolyl)ethyl] - 4 - phenylpiperazine, M.P. 142.5–144.0° C.

EXAMPLE 2

By reacting an appropriate 2-carbo-lower-alkoxy - 3-(2-chloroethyl)indole with an appropriate 1-substituted-piperazine, using the procedure described above in Example 1, there are obtained the following compounds of Formula I:

(A) 1-[2-(2-carbethoxy-5,6-dimethoxy - 3 - indolyl)-ethyl]-4-(2 - methoxyphenyl)piperazine hydrochloride, M.P. 272–274° C. prepared from 1-(2-methoxyphenyl)-piperazine and 2-carbethoxy - 5,6 - dimethoxy-3-(2-chloroethyl)indole;

(B) 1-[2 - (2 - carbethoxy - 5 - ethoxy-6-methoxy-3-indolyl)ethyl] - 4 - (4-methoxyphenyl)piperazine, prepared from 1 - (4 - methoxyphenyl)piperazine and 2-carbethoxy - 5 - ethoxy - 6 - methoxy-3-(2-chloroethyl)-indole, the latter being prepared from 3-ethoxy-4-methoxy- phenylhydrazine and α-keto-δ-valerolactone and reaction of the crude product with ethanolic hydrogen chloride, all according to the procedure described above in Example 1;

(C) 1-[2-(2 - carbethoxy - 4 - methoxy-3-indolyl)-ethyl] - 4 - (4-chlorophenyl)piperazine, prepared from 1-(4-chlorophenyl)piperazine and 2 - carbethoxy - 4-methoxy-3-(2-chloroethyl)indole, the latter being prepared by reaction of 3-methoxyphenylhydrazine and α - keto-δ-valerolactone and reaction of the crude product with ethanolic hydrogen chloride, all according to the procedure described above in Example 1;

(D) 1-[2-(2 - carbethoxy - 7 - methoxy-3-indolyl)-ethyl] - 4 - (3,4-dimethoxyphenyl)piperazine, prepared from 1 - (3,4-dimethoxyphenyl)piperazine and 2-carbethoxy - 7 - methoxy - 3 - (2 - chloroethyl)indole, the latter being prepared from 2-methoxyphenylhydrazine and α-keto-δ-valerolactone and reaction of the crude product with ethanolic hydrogen chloride, all according to the procedure described above in Example 1;

(E) 1-[2 - (2-carbethoxy - 5 - methyl-3-indolyl)ethyl]-4-(2 - methoxy - 5 - chlorophenyl)piperazine, prepared from 1-(2 - methoxy - 5 - chlorophenyl)piperazine and 2 - carbethoxy - 5 - methyl-3-(2-chloroethyl)indole, the latter being prepared from 4-methylphenylhydrazine and α-keto-δ- valerolactone and reaction of the crude product with ethanolic hydrogen chloride, all according to the procedure described above in Example 1;

(F) 1-[2 - (2 - carbethoxy - 4 - chloro-3-indolyl)ethyl]-4-(2 - methyl - 3 - chlorophenyl)piperazine, prepared from 1-(2-methyl - 3 - chlorophenyl)piperazine and 2-carbethoxy - 4 - chloro - 3 - (2-chloroethyl)indole, the latter being prepared from 3-chlorophenylhydrazine and α-keto-δ-valerolactone and reaction of the crude product with ethanolic hydrogen chloride, all according to the procedure described above in Example 1;

(G) 1-[2-(2-carbethoxy - 5-fluoro - 3-indolyl)ethyl]-4-(3-methylphenyl)piperazine, prepared from 1-(3-methylphenyl)-piperazine and 2-carbethoxy - 5-fluoro-3-(2-chloroethyl)indole, the latter being prepared from 4-fluorophenylhydrazine and α-keto-δ-valerolactone and reaction of the crude product with ethanolic hydrogen chloride, all according to the procedure described above in Example 1;

(H) 1-[2-(2-carbethoxy-5,6-methylenedioxy-3-indolyl)-ethyl]-4-(2,6-dimethylphenyl)piperazine, prepared from 1-(2,6-dimethylphenyl)piperazine and 2-carbethoxy-5,6-methylenedioxy-3-(2-chloroethyl)indole, the latter being prepared by reaction of 3,4-methylenedioxyphenylhydrazine with α-keto-δ-valerolactone and reaction of the crude product with ethanolic hydrogen chloride, all according to the procedure described above in Example 1;

(I) 1-[2-(2-carbethoxy - 5,6-ethylenedioxy - 3-indolyl)-ethyl]-4-(4-fluorophenyl)piperazine, prepared from 1-(4-fluorophenyl)piperazine and 2-carbethoxy-5,6-ethylenedioxy - 3-(2-chloroethyl)indole, the latter being prepared by reaction of 3,4-ethylenedioxyphenylhydrazine with α-keto-δ-valerolactone and reaction of the crude product with ethanolic hydrogen chloride, all according to the procedure described above in Example 1;

(J) 1-[2-(2-carbethoxy - 5-benzyloxy - 3-indolyl)ethyl]-4-(3-trifluoromethylphenyl)piperazine, prepared from 1-(3-trifluoromethylphenyl)piperazine and 2-carbethoxy-5-benzyloxy-3-(2-chloroethyl)indole, the latter being prepared by reaction of 4-benzyloxyphenylhydrazine with α-keto-δ-valerolactone and reaction of the crude product with ethanolic hydrogen chloride, all according to the procedure described above in Example 1;

(K) 1-[2-(2-carbethoxy - 5-hydroxy - 3-indolyl)ethyl]-4-(2-methylmercaptophenyl)piperazine, prepared from 1-(2-methylmercaptophenyl)piperazine and 2-carbethoxy-5-hydroxy - 3-(2-chloroethyl)indole, the latter being prepared by reaction of 4-hydroxyphenylhydrazine with α-keto-δ-valerolactone and reaction of the crude product with ethanolic hydrogen chloride, all according to the procedure described above in Example 1;

(L) 1-[2-(2-carbethoxy - 5-methylmercapto-3-indolyl)-ethlyl]-4-methylpiperazine, prepared from 1-methylpiperazine and 2-carbethoxy - 5-methylmercapto-3-(2-chloroethyl)indole, the latter being prepared by reaction of 4-methylmercaptophenylhydrazine with α-keto-δ-valerolactone and reaction of the crude product with ethanolic hydrogen chloride, all according to the procedure described above in Example 1;

(M) 1-[2-(2-carbethoxy - 6-chloro - 7-methyl - 3-indolyl)-ethyl] - 4-(2 - hydroxyethyl)piperazine, prepared from 1-(2-hydroxyethyl)piperazine and 2-carbethoxy-6-chloro - 7-methyl - 3-(2-chloroethyl)indole, the latter being prepared by reaction of 2-methyl-3-chlorophenylhydrazine with α-keto-δ-valerolactone and reaction of the crude product with ethanolic hydrogen chloride, all according to the procedure described above in Example 1;

(N) 1-[2-(2-carbethoxy - 5,6-dimethoxy-3-indolyl)ethyl]-4-(2-pyridyl)piperazine, prepared from 1-(2-pyridyl)piperazine and 2-carbethoxy - 5,6-dimethoxy - 3(2-chloroethyl)indole;

(O) 1-[2-(2-carbethoxy - 5,6-dimethoxy - 3-indolyl) ethyl] - 4-(2-pyrimidyl)piperazine, prepared from 1-(2-pyrimidyl)piperazine and 2-carbethoxy - 5,6-dimethoxy-3-(2-chloroethyl)indole;

(P) 1-[2-(2-carbethoxy - 5,6 - dimethoxy - 3-indolyl) ethyl]-4-(2-phenylethyl)piperazine, prepared from 1-(2-phenylethyl)piperazine and 2-carbethoxy - 5,6-dimethoxy-3-(2-chloroethyl)indole;

(Q) 1-[2-(2-carbethoxy - 5,6-dimethoxy - 3-indolyl) ethyl]-4-cinnamylpiperazine, prepared from 1-cinnamylpiperazine and 2-carbethoxy - 5,6 - dimethoxy - 3-(2-chloroethyl)indole;

(R) 1-[2-(2-carbopropoxy - 5,6-dimethoxy - 3-indolyl)-ethyl]-4-phenylpiperazine, M.P. 159–161° C., prepared by reaction of 1-phenylpiperazine with 2-carbopropoxy-5,6-dimethoxy - 3-(2-chloroethyl)indole, M.P. 185–186.5° C., the latter being prepared by reaction of 3,4-dimethoxyphenylhydrazine with α-keto-δ-valerolactone and reaction of the resulting product with anhydrous hydrogen chloride in absolute propanol;

(S) 1-[2-(2-carbomethoxy - 5,6-dimethoxy - 3-indolyl)-ethyl] - 4-phenylpiperazine, M.P. 156–158° C., prepared from 1-phenylpiperazine and 2-carbomethoxy - 5,6-dimethoxy - 3-(2-chloroethyl)indole, the latter prepared by reaction of 3,4-dimethoxyphenylhydrazine with α-keto-δ-valerolactone and reaction of the crude product with methanolic hydrogen chloride;

(T) 1-[2-(2-carbethoxy - 5,6-dimethoxy - 3-indolyl)-ethyl]-4-(4-hydroxyphenyl)piperazine, M.P. 161–166° C. (uncorr.), prepared from 1-(4-hydroxyphenyl)piperazine and 2-carbethoxy-5,6-dimethoxy-3-(2-chloroethyl)indole;

(U) 1-[2-(2-carbethoxy - 5-methylsulfonyl - 3-indolyl)-ethyl]-4-(4-pyridyl)piperazine, prepared from 1-(4-pyridyl)-piperazine and 2-carbethoxy - 5-methylsulfonyl-3-(2-chloroethyl)-indole, the latter prepared by reaction of 4-methylsulfonylphenylhydrazine with α-keto-δ-valerolactone and reaction of the crude product with ethanolic hydrogen chloride;

(V) 1-[2-(2-carbethoxy - 5-trifluoromethyl - 3-indolyl)-ethyl] - 4-(4 - methylsulfinylphenyl)piperazine, prepared from 1-(4-methylsulfinylphenyl)piperazine and 2-carbethoxy - 5-trifluoromethyl - 3-(2 - chloroethyl)indole, the latter prepared by reaction of 4-trifluoromethylphenylhydrazine with α-keto-δ-valerolactone and reaction of the crude product with ethanolic hydrogen chloride;

(W) 1-[2-(2-carbethoxy - 5-methylsulfinyl - 3-indolyl)-ethyl] - 4-(4-methylsulfonylphenyl)piperazine, prepared from 1-(4 - methylsulfonylphenyl)piperazine and 2-carbethoxy - 5-methylsulfinyl - 3-(2-chloroethyl)indole, the latter prepared by reaction of 4-methylsulfinylphenylhydrazine with α-keto-δ-valerolactone and reaction of the crude product with ethanolic hydrogen chloride;

(X) 1-[2-(2-carbethoxy - 3-indolyl)ethyl]-4-(3,4-methylenedioxyphenyl)piperazine, prepared from 1-(3,4-methylene-dioxyphenyl)piperazine and 2 - carbethoxy - 3-(2-chloroethyl)indole; and (Y) 1-[2-(2-carbethoxy - 3-indolyl)ethyl]-4-(3,4-ethylenedioxyphenyl)piperazine, prepared from 1-(3,4-ethylenedioxyphenyl)piperazine and 2-carbethoxy - 3-(2-chloroethyl)indole.

EXAMPLE 3

1-[2-(2-carboxy-5,6-dimethoxy-3-indolyl)ethyl]-4-phenylpiperazine

A mixture of 1.1 g. (0.0027 mole) of 1-[2-(2-carbethoxy-5,6-dimethoxy - 3 - indolyl)ethyl] - 4 - phenylpiperazine, in 10 ml. of 10% sodium hydroxide and 10 ml. of a 1:1 mixture of ethanol and water was heated under reflux for ten minutes, allowed to stand for thirty minutes, poured into water and ice, acidified with dilute hydrochloric acid, and the solid which separated was collected, washed with water, dried and recrystallized from 50% aqueous ethanol, giving 0.5 g. of 1-[2-(2-carboxy-5,6 - dimethoxy - 3 - indolyl)ethyl]-4-phenylpiperazine, M.P. 173–176° C.

The latter was converted to its 2-potassium carboxylate salt by dissolving 3.1 g. (0.008 mole) of the acid in a solution containing 425 mg. of potassium hydroxide in absolute ethanol, and recovering the salt from the cooled, concentrated mixture. The crude product was recrystallized from an ethyl acetate/ether mixture to give 3.5 g. of the potassium salt.

EXAMPLE 4

By hydrolyzing the compounds described above in Examples 2A–2Q and 2T–2Y with aqueous ethanolic sodium hydroxide, using the procedure described above in Example 3, there can be obtained the respective compounds of Formula I below where $R_2$, in each instance, is COOH:

(A) 1-[2-(2 - carboxy - 5,6 - dimethoxy-3-indolyl)-ethyl]-4-(2-methoxyphenyl)piperazine;

(B) 1-[2-(2 - carboxy - 5 - ethoxy - 6-methoxy-3-indolyl)-ethyl]-4-(4-methoxyphenyl)piperazine;

(C) 1-[2-(2 - carboxy - 4 - methoxy-3-indoyl)ethyl]-4-(4-chlorophenyl)piperazine;

(D) 1-[2-(2-carboxy - 7 - methoxy - 3-indolyl)ethyl]-4-(3,4-dimethoxyphenyl)piperazine;

(E) 1-[2-(2-carboxy - 5 - methyl - 3 - indolyl)ethyl]-4-(2-methoxy-5-chlorophenyl)piperazine;

(F) 1-[2-(2-carboxy-4-chloro - 3 - indolyl)ethyl]-4-(2-methyl-3-chlorophenyl)piperazine;

(G) 1-[2-(2-carboxy - 5 - fluoro - 3 - indolyl)ethyl]-4-(3-methylphenyl)piperazine;

(H) 1-[2-(2-carboxy - 5,6 - methylenedioxy-3-indolyl)-ethyl]-4-(2,6-dimethylphenyl)piperazine;

(I) 1-[2-(2-carboxy-5,6-ethylenedioxy - 3 - indolyl)-ethyl]-4-(4-fluorophenyl)piperazine;

(J) 1-[2-(2-carboxy-5-benzyloxy-3-indolyl)ethyl] - 4-(3-trifluoromethylphenyl)piperazine;

(K) 1-[2-(2-carboxy - 5 - hydroxy - 3-indolyl)ethyl]-4-(2-methylmercaptophenyl)piperazine;

(L) 1-[2-(2-carboxy - 5 - methylmercapto - 3-indolyl)-ethyl]-4-methylpiperazine;

(M) 1-[2-(2-carboxy - 6 - chloro-7-methyl - 3-indolyl)-ethyl]-4-(2-hydroxyethyl)piperazine;

(N) 1[2-(2-carboxy - 5,6 - dimethoxy - 3-indolyl)-ethyl]-4-(2-pyridyl)piperazine;

(O) 1-[2-(2-carboxy - 5,6-dimethoxy-3-indolyl)ethyl]-4-(2-pyrimidyl)piperazine;

(P) 1-[2-(2-carboxy - 5,6-dimethoxy - 3 - indolyl)-ethyl]-4-(2-phenylethyl)piperazine;

(Q) 1-[2-(2-carboxy - 5,6-dimethoxy-3-indolyl)ethyl]-4-cinnamylpiperazine;

(R) 1-[2-(2-carboxy-5,6-dimethoxy - 3-indolyl)ethyl]-4-(4-hydroxyphenyl)piperazine;

(S) 1-[2-(2-carboxy - 5 - methylsulfonyl - 3 - indolyl)-ethyl]-4-(4-pyridyl)piperazine;

(T) 1-[2-(2-carboxy - 5 - trifluoromethyl-3-indolyl)-ethyl]-4-(4-methylsulfinylphenyl)piperazine;

(U) 1-[2-(2-carboxy - 5 - methylsulfinyl - 3-indolyl)-ethyl]-4-(4-methylsulfonylphenyl)piperazine;

(V) 1-[2-(2-carboxy - 3 - indolyl)-ethyl]-4-(3,4-methylenedioxyphenyl)piperazine; and (W) 1-[2-(2-carboxy-3-indolyl)ethyl]-4-(3,4-ethylenedioxyphenyl)piperazine.

EXAMPLE 5

1-[2-(2-hydroxymethyl-5,6-dimethoxy-3-indolyl)ethyl]-4-phenylpiperazine

A solution of 9.3 g. (0.021 mole) of 1-[2-(2-carbethoxy - 5,6 - dimethoxy - 3 - indolyl)ethyl] - 4 - phenylpiperazine, in 100 ml. of tetrahydrofuran was added with stirring to a slurry of 2.0 g. (0.054 mole) of lithium aluminum hydride in 250 ml. of tetrahydrofuran. The mixture was stirred at room temperature for thirty minutes, decomposed with water, filtered, the filter washed with tetrahydrofuran, and the combined filtrates taken to dryness in vacuo giving 8.5 g. of a white solid which was recrystallized from methanol to give 6.6 g. of 1-[2-(2-hydroxy-methyl - 5,6 - dimethoxy - 3-indolyl)ethyl]-4-phenylpiperazine, M.P. 165–168° C.

EXAMPLE 6

By reduction of the compounds described above in Examples 2A–2Q and 2T–2Y with lithium aluminum hydride, using the procedure described above in Example 5, there can be obtained the following respective compounds of Formula I where $R_2$, in each instance, is $CH_2OH$:

(A) 1-[2-(2-hydroxymethyl - 5,6 - dimethoxy-3-indolyl)ethyl]-4-(2-methoxyphenyl)piperazine, M.P. 170–172° C.;

(B) 1-[2-(2-hydroxymethyl - 5 - ethoxy - 6-methoxy-3-indolyl)ethyl]-4-(4-methoxyphenyl)piperazine;

(C) 1-[2-(2-hydroxymethyl - 4 - methoxy - 3 - indolyl)ethyl]-4-(4-chlorophenyl)piperazine;

(D) 1-[2-(2 - hydroxymethyl - 7 - methoxy-3-indolyl)ethyl]-4-(3,4-dimethoxyphenyl)piperazine;

(E) 1 - [2-(2-hydroxymethyl - 5 - methyl-3-indolyl)ethyl]-4-(2-methoxy-5-chlorophenyl)piperazine;

(F) 1-[2-(2-hydroxymethyl - 4 - chloro - 3 - indolyl)ethyl]-4-(2-methyl-3-chlorophenyl)piperazine;

(G) 1-[2-(2-hydroxymethyl - 5 - fluoro - 3 - indolyl)ethyl]-4-(3-methylphenyl)piperazine;

(H) 1-[2-(2-hydroxymethyl - 5,6 - methylenedioxy-3-indolyl)ethyl]-4-(2,6-dimethylphenyl)piperazine;

(I) 1-[2-(2-hydroxymethyl - 5,6 - ethylenedioxy-3-indolyl)ethyl]-4-(4-fluorophenyl)piperazine;

(J) 1-[2-(2-hydroxymethyl - 5 - benzyloxy - 3-indolyl)ethyl]-4-(3-trifluoromethylphenyl)piperazine;

(K) 1-[2-(2-hydroxymethyl - 5 - hydroxy-3-indolyl)ethyl]-4-(2-methylmercaptophenyl)piperazine;

(L) 1-[2-(2-hydroxymethyl - 5 - methylcercapto-3-indolyl)ethyl]-4-methylpiperazine;

(M) 1-[2-(2-hydroxymethyl - 6 - chloro-7-methyl-3-indolyl)ethyl]-4-(2-hydroxyethyl)piperazine;

(N) 1-[2-(2-hydroxymethyl - 5,6 - dimethoxy-3-indolyl)ethyl]-4-(2-pyridyl)piperazine;

(O) 1-[2-(2-hydroxymethyl - 5,6 - dimethoxy-3-indolyl)ethyl]-4-(2-pyrimidyl)piperazine;

(P) 1-[2-(2-hydroxymethyl - 5,6 - dimethoxy-3-indolyl)ethyl]-4-(2-phenylethyl)piperazine;

(Q) 1-[2-(2-hydroxymethyl - 5,6 - dimethoxy-3-indolyl)ethyl]-4-cinnamylpiperazine;

(R) 1-[2-(2-hydroxymethyl - 5,6 - dimethoxy-3-indolyl)ethyl]-4-(4-hydroxyphenyl)piperazine;

(S) 1-[2-(2-hydroxymethyl - 5 - methylsulfonyl-3-indolyl)ethyl]-4-(4-pyridyl)piperazine;

(T) 1-[2-(2-hydroxymethyl - 5 - trifluoromethyl-3-indolyl)ethyl]-4-(4-methylsulfinylphenyl)piperazine;

(U) 1-[2-(2-hydroxymethyl - 5 - methylsulfinyl - 3 - indolyl)ethyl]-4-(4-methylsulfonylphenyl)piperazine;

(V) 1-[2-(2-hydroxymethyl - 3 - indolyl)ethyl]-4-(3,4-methylenedioxyphenyl)piperazine; and (W) 1-[2-(2-hydroxymethyl - 3 - indolyl)ethyl]-4-(3,4-ethylenedioxyphenyl)piperazine.

EXAMPLE 7

1-[2-(2-acetoxymethyl - 5,6 - dimethoxy-3-indolyl)ethyl] 4-phenylpiperazine

By reaction of 1-[2-(2-hydroxymethyl-5,6-dimethoxy-3-indolyl)ethyl]-4-phenylpiperazine with acetyl chloride in the presence of pyridine, there can be obtained 1-[2-(2-acetoxymethyl - 5,6 - dimethoxy - 3 - indolyl)ethyl]-4-phenylpiperazine.

EXAMPLE 8

By reaction of the compounds described above in Example 6 with acetyl chloride in the presence of pyridine, using the procedure described above in Example 7, there can be obtained the following respective compounds of Formula I where $R_2$, in each instance, is $CH_2OCOCH_3$:

(A) 1-[2-(2-acetoxymethyl - 5,6 - dimethoxy-3-indolyl)ethyl]-4-(2-methoxyphenyl)piperazine;

(B) 1-[2-(2-acetoxymethyl - 5 - ethoxy-6-methoxy-3-indolyl)ethyl]-4-(4-methoxyphenyl)piperazine;

(C) 1-[2-(2-acetoxymethyl - 4 - methoxy-3-indolyl)ethyl]-4-(4-chlorophenyl)piperazine;

(D) 1-[2-(2-acetoxymethyl - 7 - methoxy-3-indolyl)ethyl]-4-(3,4-dimethoxyphenyl)piperazine;

(E) 1-[2-(2-acetoxymethyl - 5 - methyl - 3 - indolyl)ethyl]-4-(2-methoxy-5-chlorophenyl)piperazine;

(F) 1-[2-(2-acetoxymethyl - 4 - chloro - 3 - indolyl)ethyl]-4-(2-methyl-3-chlorophenyl)piperazine;

(G) 1-[2-(2-acetoxymethyl - 5 - fluoro - 3 - indolyl)ethyl]-4-(3-methylphenyl)piperazine;

(H) 1-[2-(2-acetoxymethyl - 5,6 - methylenedioxy-3-indolyl)ethyl] - 4 - (2,6-dimethylphenyl)piperazine;

(I) 1-[2-(2-acetoxymethyl - 5,6 - ethylenedioxy-3-indolyl)ethyl]-4-(4-fluorophenyl)piperazine;

(J) 1-[2-(2-acetoxymethyl - 5 - benzyloxy-3-indolyl)ethyl]-4-(3-trifluoromethylphenyl)piperazine;

(K) 1-[2-(2-acetoxymethyl - 5 - hydroxy-3-indolyl)ethyl]-4-(2-methylmercaptophenyl)piperazine;

(L) 1-[2-(2-acetoxymethyl - 5 - methylmercapto-3-indolyl)ethyl]-4-methylpiperazine;

(M) 1-[2-(2-acetoxymethyl - 6 - chloro-7-methyl-3-indolyl)ethyl]-4-(2-hydroxyethyl)piperazine;

(N) 1-[2-(2-acetoxymethyl - 5,6 - dimethoxy-3-indolyl)ethyl]-4-(2-pyridyl)piperazine;

(O) 1-[2-(2-acetoxymethyl - 5,6 - dimethoxy-3-indolyl)ethyl]-4-(2-pyrimidyl)piperazine;

(P) 1-[2-(2-acetoxymethyl - 5,6 - dimethoxy-3-indolyl)ethyl]-4-(2-phenylethyl)piperazine;

(Q) 1-[2-(2-acetoxymethyl - 5,6 - dimethoxy-3-indolyl)ethyl]-4-cinnamylpiperazine;

(R) 1-[2-(2-acetoxymethyl - 5,6 - dimethoxy-3-indolyl)ethyl]-4-(4-hydroxyphenyl)piperazine;

(S) 1-[2-(2-acetoxymethyl - 5 - methylsulfonyl-3-indolyl)ethyl]-4-(4-pyridyl)piperazine;

(T) 1-[2-(2-acetoxymethyl - 5 - trifluoromethyl-3-indolyl)ethyl]-4-(4-methylsulfinylphenyl)piperazine;

(U) 1-[2-(2-acetoxymethyl - 5 - methylsulfinyl-3-indolyl)ethyl]-4-(4-methylsulfonylphenyl)piperazine;

(V) 1-[2-(2-acetoxymethyl - 3 - indolyl)ethyl]-4-(3,4-methylenedioxyphenyl)piperazine; and (W) 1-[2-(2-acetoxymethyl - 3 - indolyl)ethyl]-4-(3,4-ethylenedioxyphenyl)piperazine.

EXAMPLE 9

1-[2-(2-formyl-5,6-dimethoxy-3-indolyl)ethyl]-4-phenylpiperazine

By reaction of 1-[2-(2-carboxy - 5,6 - dimethoxy-3-indolyl)ethyl]-4-phenylpiperazine with thionyl chloride in an organic solvent, for example toluene, and reduction of the resulting 1-[2-(2-chloroformyl-5,6-dimethoxy-3-indolyl)ethyl]-4-phenylpiperazine with tri-t-butoxy lithium aluminum hydride, there can be obtained 1-[2-(2-formyl-5,6-dimethoxy-3-indolyl)ethyl]-4-phenylpiperazine.

EXAMPLE 10

By reaction of the compounds described above in Example 4 with thionyl chloride, and reduction of the resulting 2-chloroformyl compounds with tri-t-butoxy lithium aluminum hydride, all according to the procedure described above in Example 9, there can be obtained the following respective compounds of Formula I where $R_2$, in each instance, is CHO:

(A) 1 - [2-(2-formyl-5,6-dimethoxy-3-indolyl)-ethyl]-4-(2-methoxyphenyl)piperazine;

(B) 1-[2-(2-formyl-5-ethoxy-6-methoxy - 3 - indolyl)-ethyl]-4-(4-methoxyphenyl)piperazine;

(C) 1-[2-(2-formyl-4-methoxy - 3 - indolyl)ethyl]-4-(4-chlorophenyl)piperazine;

(D) 1 - [2 - (2-formyl-7-methoxy-3-indolyl)ethyl]-4-(3,4-dimethoxyphenyl)piperazine;

(E) 1-[2-(2 - formyl - 5-methyl-3-indolyl)ethyl]-4-(2-methoxy-5-chlorophenyl)piperazine;

(F) 1-[2-(2-formyl - 4 - chloro-3-indolyl)ethyl]-4-(2-methyl-3-chlorophenyl)piperazine;

(G) 1-[2-(2-formyl-5-fluoro - 3 - indolyl)ethyl]-4-(3-methylphenyl)piperazine;

(H) 1-[2-(2-formyl-5,6-methylenedioxy - 3 - indolyl)-ethyl]-4-(2,6-dimethylphenyl)piperazine;

(I) 1-[2-(2 - formyl - 5,6 - ethylenedioxy-3-indolyl)-ethyl]-4-(4-fluorophenyl)piperazine;

(J) 1-[2-(2-formyl - 5 - benzyloxy-3-indolyl)ethyl]-4-(3-trifluoromethylphenyl)piperazine.

(K) 1-[2-(2-formyl-5-hydroxy - 3 - indolyl)ethyl]-4-(2-methylmercaptophenyl)piperazine;

(L) 1 - [2 - (2 - formyl-5-methylmercapto-3-indolyl)ethyl]-4-methylpiperazine;

(M) 1-[2-(2-formyl - 6 - chloro-7-methyl-3-indolyl)-ethyl]-4-(2-hydroxyethyl)piperazine;

(N) 1 - [2-(2-formyl-5,6-dimethoxy-3-indolyl)ethyl]-4-(2-pyridyl)piperazine;

(O) 1-[2-(2-formyl-5,6-dimethoxy - 3 - indolyl)ethyl]-4-(2-pyrimidyl)piperazine;

(P) 1-[2-(2-formyl - 5,6-dimethoxy - 3 - indolyl)ethyl]-4-(2-phenylethyl)piperazine;

(Q) 1-[2-(2 - formyl - 5,6-dimethoxy-3-indolyl)ethyl]-4-cinnamylpiperazine;

(R) 1-[2 - (2 - formyl-5,6-dimethoxy-3-indolyl)ethyl]-4-(4-hydroxyphenyl)piperazine;

(S) 1-[2-(2-formyl - 5 - methylsulfonyl-3-indolyl)ethyl]-4-(4-pyridyl)piperazine;

(T) 1-[2-(2 - formyl - 5 - trifluoromethyl-3-indolyl)ethyl]-4-(4-methylsulfinylphenyl)piperazine;

(U) 1-[2-(2-formyl-5-methylsulfinyl-3-indolyl)ethyl]-4-(4-methylsulfonylphenyl)piperazine;

(V) 1-[2-(2-formyl - 3 - indolyl)ethyl]-4-(3,4-methylenedioxyphenyl)piperazine; and (W) 1-[2-(2-formyl-3-indolyl)ethyl] - 4-(3,4-ethylenedioxyphenyl)piperazine.

EXAMPLE 11

1-[2-(2-isonitrosomethylene-5,6-dimethoxy-3-indolyl)ethyl]-4-phenylpiperazine

By reaction of 1-[2-(2-formyl-5,6-dimethoxy-3-indolyl)ethyl]-4-phenylpiperazine with hydroxylamine in ethanol in the presence of a small amount of hydrochloric acid, there can be obtained 1-[2-(2-isonitrosomethylene-5,6-dimethoxy-3-indolyl)ethyl]-4-phenylpiperazine.

EXAMPLE 12

By reaction of the compounds described above in Example 10 with hydroxylamine, using the procedure described above in Example 11, there can be obtained the following respective compounds of Formula I where $R_2$, in each instance, is isonitrosomethylene (CH=NOH):

(A) 1-[2-(2-isonitrosomethylene - 5,6 - dimethoxy-3-indolyl)ethyl]-4-(2-methoxyphenyl)piperazine;

(B) 1-[2-(2-isonitrosomethylene - 5-ethoxy-6-methoxy-3-indolyl)ethyl]-4-(4-methoxyphenyl)piperazine;

(C) 1-[2-(2-isonitrosomethylene - 4 - methoxy-3-indolyl)ethyl]-4-(4-chlorophenyl)piperazine;

(D) 1-[2 - (2 - isonitrosomethylene-7-methoxy-3-indolyl)ethyl]-4-(3,4-dimethoxyphenyl)piperazine;

(E) 1-[2-(2-isonitrosomethylene - 5 - methyl - 3 - indolyl)ethyl]-4-(2-methoxy-5-chlorophenyl)piperazine;

(F) 1-[2 - (2-isonitrosomethylene-4-chloro-3-indolyl)-ethyl]-4-(2-methyl-3-chlorophenyl)piperazine;

(G) 1-[2 - (2-isonitrosomethylene-5-fluoro-3-indolyl)-ethyl]-4-(3-methylphenyl)piperazine;

(H) 1-[2-(2-isonitrosomethylene-5,6-methylenedioxy-3-indolyl)ethyl]-4-(2,6-dimethylphenyl)piperazine;

(I) 1-[2-(2 - isonitrosomethylene-5,6-ethylenedioxy-3-indolyl)ethyl]-4-(4-fluorophenyl)piperazine;

(J) 1 - [2 - (2-isonitrosomethylene-5-benzyloxy-3-indolyl)ethyl]-4-(3-trifluoromethylphenyl)piperazine;

(K) 1 - [2 - (2-isonitrosomethylene-5-hydroxy-3-indolyl)ethyl]-4-(2-methylmercaptophenyl)piperazine;

(L) 1-[2-(2 - isonitrosomethylene-5-methylmercapto-3-indolyl)ethyl]-4-methylpiperazine;

(M) 1-[2-(2-isonitrosomethylene - 6 - chloro-7-methyl-3-indolyl)ethyl]-4-(2-hydroxyethyl)piperazine;

(N) 1-[2 - (2 - isonitrosomethylene-5,6-dimethoxy-3-indolyl)ethyl]-4-(2-pyridyl)piperazine;

(O) 1-[2-(2-isonitrosomethylene - 5,6 - dimethoxy-3-indolyl)ethyl]-4-(2-pyrimidyl)piperazine;

(P) 1-[2-(2-isonitrosomethylene - 5,6 - dimethoxy-3-indolyl)ethyl]-4-(2-phenylethyl)piperazine;

(Q) 1-[2-(2 - isonitrosomethylene - 5,6-dimethoxy-3-indolyl)ethyl]-4-cinnamylpiperazine;

(R) 1-[2-(2-isonitrosomethylene - 5,6 - dimethoxy-3-indolyl)ethyl]-4-(4-hydroxyphenyl)piperazine;

(S) 1 - [2 - (2-isonitrosomethylene-5-methylsulfonyl-3-indolyl)ethyl]-4-(4-pyridyl)piperazine;

(T) 1-[2-isonitrosomethylene - 5 - trifluoromethyl-3-indolyl)ethyl]-4-(4-methylsulfinylphenyl)piperazine;

(U) 1-[2-(2-isonitrosomethylene - 5 - methylsulfinyl-3-indolyl)ethyl]-4-(4-methylsulfonylphenyl)piperazine;

(V) 1-[2 - (2 - isonitrosomethylene-3-indolyl)ethyl]-4-(3,4-methylenedioxyphenyl)piperazine; and (W) 1 - [2-(2-isonitrosomethylene-3-indolyl)ethyl]-4-(3,4-ethylenedioxyphenyl)piperazine.

EXAMPLE 13

1-[2-(2-carbamyl-5,6-dimethoxy-3-indolyl)ethyl]-4-phenylpiperazine

By reaction of 1 - [2 - (2-carboxy-5,6-dimethoxy-3-indolyl)ethyl]-4-phenylpiperazine with thionyl chloride in toluene, and reacting the resulting 2-chloroformyl compound with anhydrous ammonia, there can be obtained 1-[2 - (2 - carbamyl-5,6 - dimethoxy-3-indolyl)ethyl]-4-phenylpiperazine.

EXAMPLE 14

By reacting the compounds described above in Example 4 with thionyl chloride, and reacting the resulting 2-chloroformyl compounds with anhydrous ammonia, N-methylamine, or N,N-dimethylamine, all according to the procedure described above in Example 13, there can be obtained the following respective compounds of Formula I where $R_2$ is carbamyl ($CONH_2$), N-methylcarbamyl ($CONHCH_3$), or N,N-dimethylcarbamyl [$CON(CH_3)_2$]:

(A) 1 - [2-(2-carbamyl-5,6-dimethoxy3-indolyl)ethyl]-4-(2-methoxyphenyl)piperazine ($R_2$ is $CONH_2$);

(B) 1-{2-[2-(N-methylcarbamyl)-5-ethoxy-6-methoxy-3 - indolyl]ethyl} - 4-(4-methoxyphenyl)piperazine $R_2$ is $CONHCH_3$);

(C) 1 - {2 - [2-(N,N-dimethylcarbamyl)-4-methoxy-3-indolyl]ethyl} - 4 - (4 - chlorophenyl)piperazine [$R_2$ is $CON(CH_3)_2$];

(D) 1 - [2 - (2-carbamyl-7-methoxy-3-indolyl)ethyl]-4-(3,4-dimethoxyphenyl)piperazine ($R_2$ is $CONH_2$);

(E) 1-{2-[2-(N-methylcarbamyl)-5-methyl-3-indolyl]- ethyl} - 4 - (2 - methoxy-5-chlorophenyl)piperazine (R₂ is CONHCH₃);

(F) 1 - {2 - [2 - (N,N-dimethylcarbamyl)-4-chloro-3-indolyl]ethyl}-4-(2-methyl-3-chlorophenyl)piperazine [R₂ is CON(CH₃)₂];

(G) 1 - [2-(2-carbamyl-5-fluoro-3-indolyl)ethyl]-4-(3-methylphenyl)piperazine (R₂ is CONH₂);

(H) 1-{2-[2-(N-methylcarbamyl)-5,6-methylenedioxy-3-indolyl]ethyl}-4-(2,6-dimethylphenyl)piperazine (R₂ is CONHCH₃);

(I) 1 - {2 - [2 - (N,N - dimethylcarbamyl)-5,6-ethylenedioxy-3-indolyl]ethyl}-4-(4-fluorophenyl)piperazine R₂ is CON(CH₃)₂];

(J) 1 - [2-(2-carbamyl-5-benzyloxy-3-indolyl)ethyl]-4-(3-trifluoromethylphenyl)piperazine (R₂ is CONH₂);

(K) 1 - {2 - [2 - (N - methylcarbamyl) - 5 - hydroxy-3-indolyl]ethyl}-4-(2-methylmercaptophenyl)piperazine (R₂ is CONHCH₃);

(L) 1-{2-[2-(N,N-dimethylcarbamyl)-5-methylmercapto-3-indolyl]ethyl}-4-methylpiperazine [R₂ is

CON(CH₃)₂]

(M) 1 - [2 - (2-carbamyl-6-chloro-7-methyl-3-indolyl)-ethyl]-4-(2-hydroxyethyl)piperazine (R₂ is CONH₂);

(N) 1 - {2 - [2 - (N-methylcarbamyl)-5,6-dimethoxy-3-indolyl]ethyl}-4-(2-pyridyl)piperazine (R₂ is

CONCHC₃)

(O) 1-{2-[2-N,N-dimethylcarbamyl)-5,6-dimethoxy-3-indolyl]ethyl}-4-2-(2-pyrimidyl)piperazine [R₂ is

CON(CH₃)₂]

(P) 1-[2-(2-carbamyl-5,6-dimethoxy-3-indolyl)ethyl]-4-(2-phenylethyl)piperazine (R₂ is CONH₂);

(Q) 1 - {2 - [2 - (N-methylcarbamyl)-5,6-dimethoxy-3-indolyl]ethyl}-4-cinnamylpiperazine (R₂ is CONHCH₃);

(R) 1 - {2-[2-(N,N-dimethylcarbamyl)-5,6-dimethoxy-3 - indolyl]ethyl} - 4 - (4-hydroxyphenyl)piperazine [R₂ is CON(CH₃)₂];

(S) 1-{2-[2-(N,N-dimethylcarbamyl)-5-methylsulfonyl-3-indolyl]ethyl}-4-(4-pyridyl)piperazine [R₂ is

CON(CH₃)₂]

(T) 1 - [2 - (2 - carbamyl-5-trifluoromethyl-3-indolyl)-ethyl] - 4 - (4 - methylsulfinylphenyl)piperazine (R₂ is CONH₂);

(U) 1-{2-[2-(N,N-dimethylcarbamyl)-5-methylsulfinyl-3 - indolyl]ethyl} - 4-(4-methylsulfonylphenyl)piperazine [R₂ is CON(CH₃)₂];

(V) 1 - [2-(2-carbamyl-3-indolyl)ethyl]-4-(3,4-methylenedioxyphenyl)piperazine [R₂ is CONH₂]; and (W) 1 - {2-[2-(N-methylcarbamyl)-3-indolyl]ethyl}-4-(3,4-ethylenedioxyphenyl)piperazine (R₂ is CONHCH₃).

EXAMPLE 15

1-[2-(2-sulfo-5,6-methylenedioxy-3-indolyl)ethyl]-4-(2-methoxyphenyl)piperazine

A solution of 13 g. (0.034 mole) of 1-[2-(5,6-methylenedioxy - 3 - indolyl)ethyl]-4-(2-methoxyphenyl)piperazine and 65 g. (0.63 mole) of sodium bisulfite in 1.5 liters of ethanol and 2 liters of water was adjusted to pH 7, and air was bubbled through the mixture for seventy-two hours. The solid which had separated was collected, dissolved in dilute sodium hydroxide and the solution extracted with ether. The aqueous raffinate was acidified to pH 4.5, and the solid which separated was collected and recrystallized from dilute acetic acid to give 5.8 g. of 1 - [2-(2-sulfo-5,6-methylenedioxy-3-indolyl)ethyl]-4-(2-methoxyphenyl)piperazine, M.P. 245.0–246.0° C. (corr.).

I claim:
1. A compound having the formula

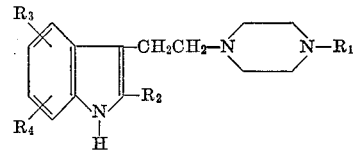

where R₁ is lower-alkyl, hydroxy-lower-alkyl, phenyl, phenyl-unbranched-lower-alkyl, cinnamyl, pyridyl, or 2-pyrimidyl; R₂ is carbo-lower-alkoxy, carboxy, sulfo, hydroxymethyl, lower-alkanoyloxymethyl, carbamyl, N-lower - alkylcarbamyl, N,N - di - lower - alkylcarbamyl, formyl, or isonitrosomethylene, and alkali metal salts of compounds where R₂ is carboxy or sulfo; R₃ is hydrogen, halogen, straight or unhindered lower-alkyl, lower-alkoxy, lower-alkylmercapto, trifluoromethyl, or hydroxy; R₄ is hydrogen, halogen, straight or unhindered lower-alkyl or lower-alkoxy, or R₃ and R₄ together represent methylenedioxy or ethylenedioxy attached to adjacent carbon atoms, and wherein the benzene ring of R₁ as phenyl, phenyl-unbranched-lower-alkyl, or cinnamyl is unsubstituted or substituted by adjacent methylenedioxy or ethylenedioxy or by one or two of the same or different members of the group consisting of halogen, straight or unhindered lower-alkyl, lower-alkoxy, lower-alkylmercapto, trifluoromethyl, or hydroxy.

2. A compound according to claim 1 where R₁ is unsubstituted-phenyl; R₂ is carbo-lower-alkoxy; and R₃ and R₄ are each lower-alkoxy.

3. A compound according to claim 1 where R₁ is lower-alkoxy-substituted-phenyl; R₂ is carbo-lower-alkoxy; and R₃ and R₄ are each lower-alkoxy.

4. A compound according to claim 1 where R₁ is hydroxy-substituted-phenyl; R₂ is carbo-lower-alkoxy; and R₃ and R₄ are each lower-alkoxy.

5. A compound according to claim 1 where R₁ is unsubstituted-phenyl; R₂ is carboxy or an alkali metal salt thereof; and R₃ and R₄ are each lower-alkoxy.

6. A compound according to claim 1 where R₁ is unsubstituted-phenyl; R₂ is hydroxymethyl; and R₃ and R₄ are each lower-alkoxy.

7. A compound according to claim 1 where R₁ is lower-alkoxy-substituted-phenyl; R₂ is hydroxymethyl; and R₃ and R₄ are each lower-alkoxy.

8. A compound according to claim 1 where R₁ is lower-alkoxy-substituted-phenyl; R₂ is sulfo; and R₃ and R₄ together represent methylenedioxy attached to adjacent carbon atoms.

9. 1 - [2 -(2- carbethoxy-5,6-dimethoxy-3-indolyl)-ethyl]-4-phenylpiperazine according to claim 2 where R₂ is carbethoxy; and R₃ and R₄ together are 5,6-dimethoxy.

10. 1 - [2 - (2-carbomethoxy-5,6-dimethoxy-3-indolyl)-ethyl]-4-phenylpiperazine according to claim 2 where R₂ is carbomethoxy; and R₃ and R₄ together are 5,6-dimethoxy.

11. 1 - [2 - (2-carbopropoxy-5,6-dimethoxy-3-indolyl)-ethyl]-4-phenylpiperazine according to claim 2 where R₂ is carbopropoxy; and R₃ and R₄ together are 5,6-dimethoxy.

12. 1 - [2-(2-carbethoxy-5,6-dimethoxy-3-indolyl)-ethyl]-4-(2-methoxyphenyl)piperazine according to claim 3 where R₁ is 2-methoxyphenyl; R₂ is carbethoxy; and R₃ and R₄ together are 5,6-dimethoxy.

13. 1 - [2-(2-carbethoxy-5,6-dimethoxy-3-indolyl)-ethyl]-4-(4-hydroxyphenyl)piperazine according to claim 4 wherein R₁ is 4-hydroxyphenyl; R₂ is carbethoxy; and R₃ and R₄ together are 5,6-dimethoxy.

14. 1 - [2 - (2-carboxy-5,6-dimethoxy-3-indolyl)ethyl]-

4-phenylpiperazine according to claim 5 where $R_2$ is carboxy; and $R_3$ and $R_4$ together are 5,6-dimethoxy.

15. 1 - [2-(2-hydroxymethyl-5,6-dimethoxy-3-indolyl)-ethyl]-4-phenylpiperazine according to claim 6 where $R_3$ and $R_4$ together are 5,6-dimethoxy.

16. 1 - [2-(2-hydroxymethyl-5,6-dimethoxy-3-indolyl)-ethyl]-4-(2-methoxyphenyl)piperazine according to claim 7 where $R_1$ is 2-methoxyphenyl; and $R_3$ and $R_4$ together are 5,6-dimethoxy.

17. 1 - [2 - (2-sulfo-5,6-methylenedioxy-3-indolyl)-ethyl]-4-(2-methoxyphenyl)piperazine according to claim 8 where $R_1$ is 2-methoxyphenyl; and $R_3$ and $R_4$ together are 5,6-methylenedioxy.

References Cited

UNITED STATES PATENTS

| | | | |
|---|---|---|---|
| 3,182,071 | 5/1965 | Shavel et al. | 260—319 |
| 3,188,313 | 6/1965 | Archer | 260—268 |
| 3,466,287 | 9/1969 | Archer | 260—268 |
| 3,472,870 | 10/1969 | Larsen et al. | 260—268X |

DONALD G. DAUS, Primary Examiner

U.S. Cl. X.R.

260—240, 256.4, 326.13, 343.5, 569; 424—250

FO-1050
(5/69)

UNITED STATES PATENT OFFICE
CERTIFICATE OF CORRECTION

Patent No. 3,562,278          Dated    February 9, 1971

Inventor(s)  Sydney Archer

It is certified that error appears in the above-identified patent and that said Letters Patent are hereby corrected as shown below:

Column 1, line 23, "which is" should read --which in--.

Column 2, line 32, "(2-hydroxyethyl indole" should read --(2-hydroxyethyl)indole--.

Column 5, line 28, "abovedescribed" should read --above cribed--.

Column 9, line 54, "methylcercapto" should read --methy mercapto--.

Column 10, line 40, "ethyl)" should read --ethyl]--.

Column 12, line 35, "1-[2-isonitrosomethylene-..." should read --1-[2-(2-nitroisomethylene-...--; line 67, "$R_2$ is ..." should read --($R_2$ is ...--.

Column 13, line 12, "$R_2$ is..." should read --[$R_2$ is ... line 28, "CONCHC$_3$)" should read --CONHCH$_3$)--; line 30, "[2-N,N-...)" should read --[2-(N,N-...)--; line 31, "4-2-(2-pyri should read --4-(2-pyrimidyl)--.

Column 14, line 73, "wherein" should read --where--.

Signed and sealed this 11th day of January 1972.

(SEAL)
Attest:

EDWARD M. FLETCHER, JR.          ROBERT GOTTSCHALK
Attesting Officer                Acting Commissioner of Paten